United States Patent [19]

Mollon

[11] 4,124,445
[45] Nov. 7, 1978

[54] STORAGE RACK FOR FUEL CELL RECEIVING SHROUDS

[75] Inventor: Leslie Mollon, Southfield, Mich.

[73] Assignee: Brooks & Perkins, Incorporated, Southfield, Mich.

[21] Appl. No.: 730,216

[22] Filed: Oct. 6, 1976

[51] Int. Cl.² .................................... G21C 19/32
[52] U.S. Cl. ........................ 176/87; 252/301.1 W; 248/68 R
[58] Field of Search .................... 170/37, 87; 252/301.1 W; 248/68 R

[56] References Cited

U.S. PATENT DOCUMENTS

| 3,046,403 | 7/1962 | Montgomery | 252/301.1 W |
| 3,397,113 | 8/1968 | Stafford | 176/37 |
| 3,961,920 | 6/1976 | Gilbert | 176/37 X |

Primary Examiner—Peter A. Nelson
Attorney, Agent, or Firm—Whittemore, Hulbert & Belknap

[57] ABSTRACT

A rack for receiving a multiplicity of vertical tubular shrouds or tubes for storing spent nuclear fuel cells. The rack comprises a plurality of horizontally reticulated frames interconnected by tension rods and spacing tubes surrounding the rods.

8 Claims, 5 Drawing Figures

STORAGE RACK FOR FUEL CELL RECEIVING SHROUDS

SUMMARY OF THE INVENTION

Present practice is to store radioactive spent fuel cells in vertical elongated shrouds or tubes in which cooling and preferably neutron absorbing water surrounds the cells. Additional neutron absorbing material is provided as necessary.

In accordance with the present invention, there is provided a rack composed of a plurality of horizontal reticulated frames, each of which is made up by a plurality of bars. The frames are rigidly held in vertically spaced relation by tension rods extending through spacing tubes interposed between adjacent frame assemblies.

DETAILED DESCRIPTION

Figure 1:
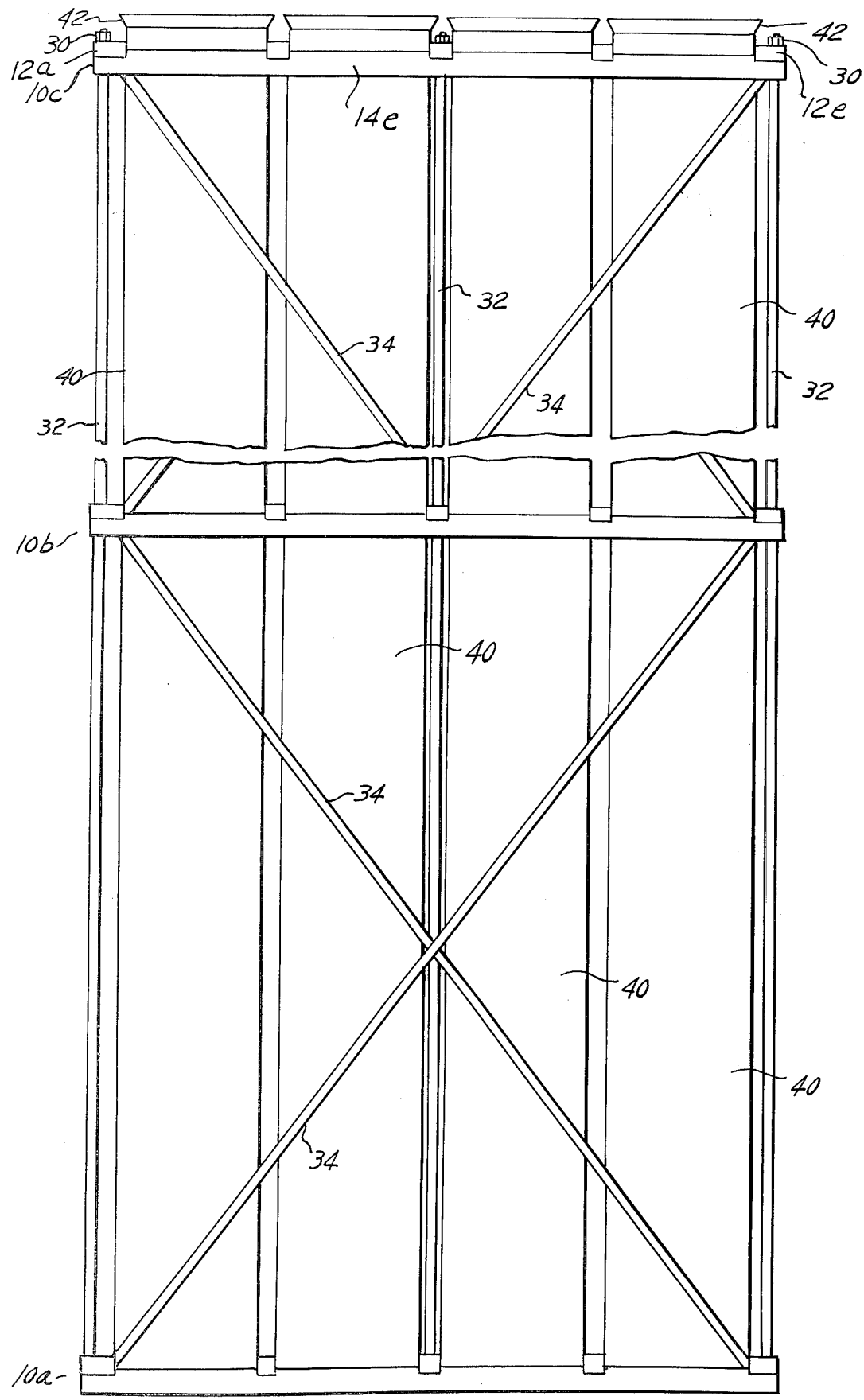
FIG. 1 is an elevational view of the frame illustrating some of the shrouds or tubes in place.
Figure 2:
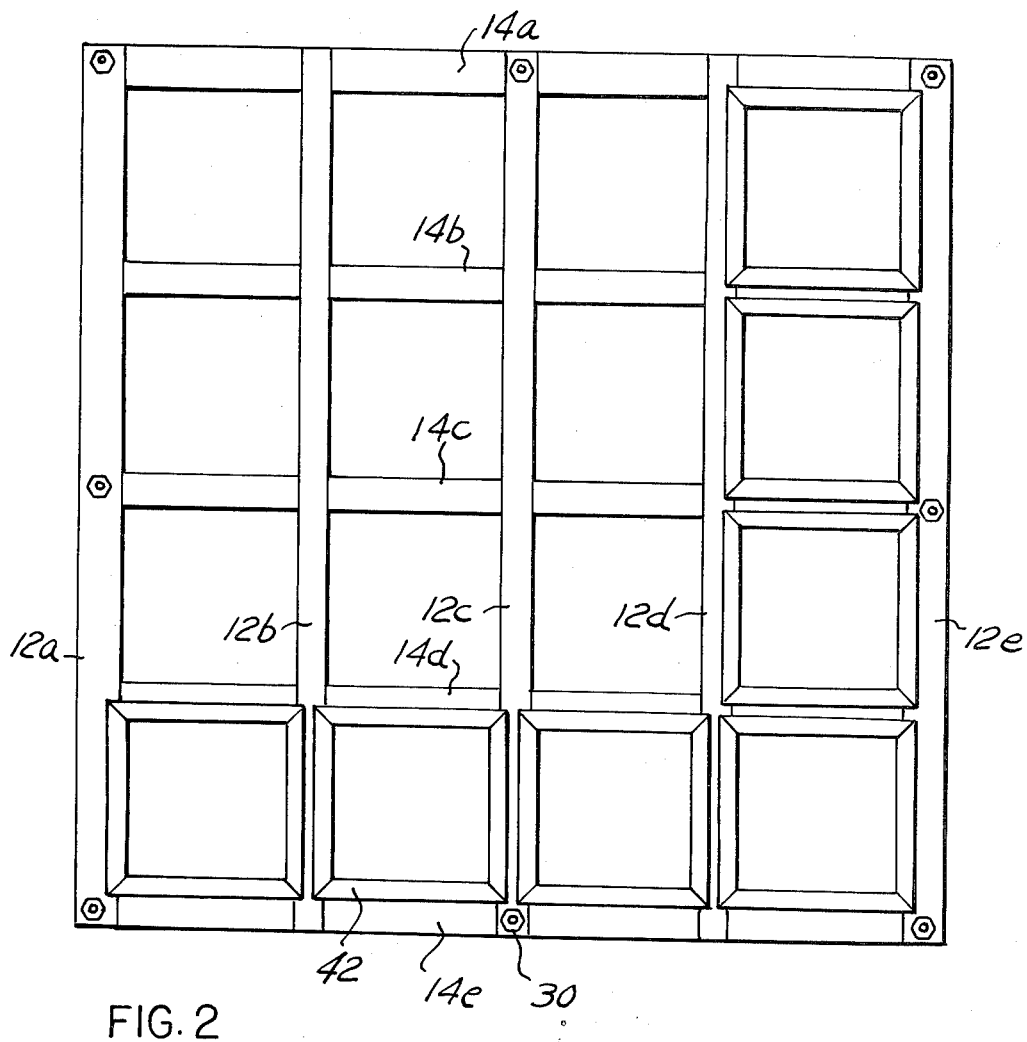
FIG. 2 is a plan view of the structure illustrated in FIG. 1.

Referring first to FIGS. 1 and 2, the rack is vertically elongated and may have a height substantially in excess of ten feet. In FIG. 1, a bottom frame is illustrated as connected to the next superimposed frame and the remaining structure is eliminated with the exception of the upper frame.

The rack comprises a plurality of frames including a bottom frame assembly 10a, a superimposed frame assembly 10b, and an uppermost frame assembly 10c. Each of the frames comprises a reticulated assembly of bars, the bars being best illustrated in FIG. 2 as comprising a plurality of parallel bars 12a, 12b, 12c, 12d and 12e. Crossing these bars and interconnected therewith, as will be subsequently described, are a further plurality of parallel bars 14a, 14b, 14c, 14d and 14e.

Figure 3:
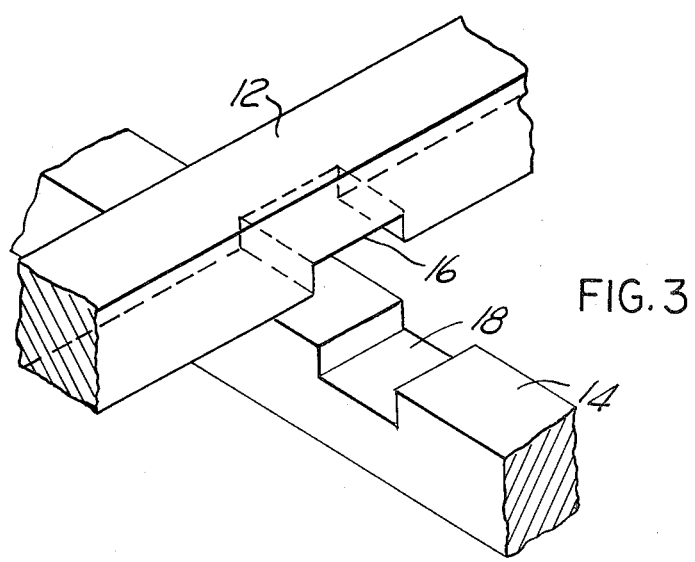
FIG. 3 is a fragmentary enlarged view showing interconnecting bottom frame bars.

In order to provide a completely rigid frame assembly, the crossing bars designated generally 12 and 14 are provided with interconnecting notches 16 and 18, as best illustrated in FIG. 3. The bars are assembled with the notches interfitting, and the bars are welded together at these crossing points. Thus, the individual bars are each rigidly connected to a plurality of crossing bars, both by a weld connection and by the interfitting notch connection.

Figure 4:
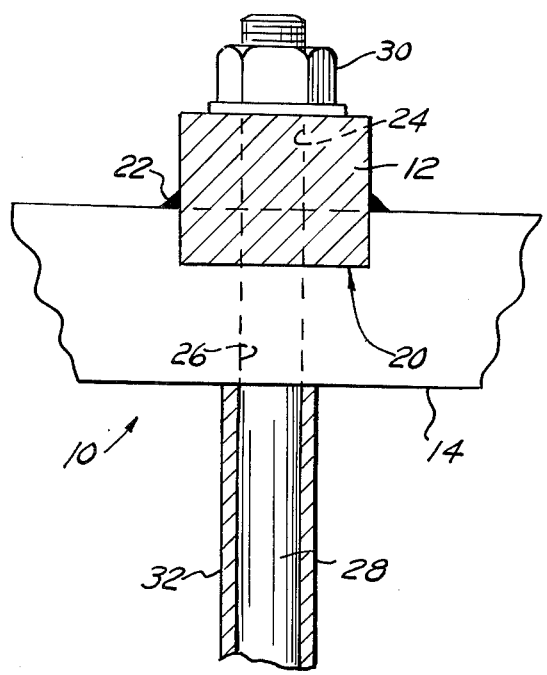
FIG. 4 is an enlarged elevational view, partly in section, showing the rods and tubes associated with the frame bars.

The individual frames 10a to 10d are rigidly assembled in vertically spaced relation by structure best illustrated in FIG. 4. In this Figure, a bar generically designated at 14 is illustrated as connected to a crossing bar generically designated at 12 with the notched interconnection illustrated generically at 20. The weld connection between the bars 12 and 14 is indicated at 22.

At the crossing point of the bars 12 and 14 the bars are provided with rod receiving openings 24 and 26 through which an assembly rod 28 is passed. Rod 28 is a tension rod and is tensioned by the application of a nut 30 to the threaded upper ends of the rods. It is to be understood that rods 28 are in effect elongated bolts, having integrally formed heads at one end, and being threaded at the other end. In order to maintain the frames generically designated 10 in spaced relation, tubular spacer elements tubes 32 are interposed between frames with the ends of the tubes abutting the adjacent surfaces of the frame bars as best illustrated in FIG. 4. Rods 28 fit snugly within the tubes and in the completed assembly the rods 28 are in tension, the tubes 32 are in compression, and the rods 28 and tubes 32 reinforce each other. To impart further rigidity to the rack diagonal tension braces 34 are provided which extend diagonally between vertically spaced frames 10 and which are rigidly secured at their ends to the ends of frame bars. This connection between the tension brace rods 34 and the frame bars may be by welding but preferably it is provided by separable fastening means such, for example, as nuts applied to threaded end portions at both ends of tension rods; or an integral head at one end, and a nut applied to the threaded opposite end. The brace rods of course in this case extend through openings adjacent the ends of outer frame bars 12 or 14 and the nut or nuts are tightened to provide a rigid structure. This permits the rack which when assembled is bulky and not readily handled, to be assembled in the field and where desirable to be disassembled and transported for reassembly at a different position.

Referring again to FIG. 1, there are illustrated a plurality of cans or shrouds 40, each of which as illustrated is provided with an upper outwardly flared end portion 42 for assisting in guiding spent fuel cells into the upper open ends of the shrouds or cans.

Preferably, each tubular cannister 40 is formed with its side walls in the form of a sandwich comprising inner and outer walls of a material such as stainless steel and the space between said inner and outer walls receiving a neutron-absorbing material such as boron carbide.

Figure 5:
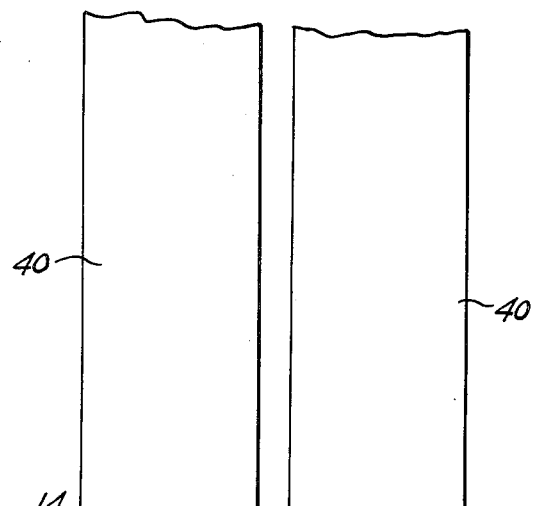
FIG. 5 is a fragmentary sectional view at the bottom of the storage rack.

As best illustrated in FIG. 2, the outwardly flared end portions 42 overlie portions of the bars 12 and 14 and the shrouds are retained in assembled position by being received in the reticulated openings between the bars 12 and 14. Referring now to FIG. 5, the bottom frame 10a rests upon a base plate 44 which is provided with openings 46 in line with each of the storage cans or cannisters 40 so as to provide for free circulation of cooling water therethrough. In addition, the base plate 44 is retained in spaced relation above the supporting floor 48 of the storage pool by anchor brackets 50 preferably welded to the underside of the plate 44 and having provision for the reception of anchor bolts 52 extending into the supporting floor.

Tension rods 28 of course are headed at the lower end so that tightening nuts 30 tensions the rods and applies compressive forces to tubes 32.

What I claim as my invention is:

1. A rack for receiving open-ended tubular cannisters for storing radioactive nuclear fuel cells, said rack comprising a plurality of reticulated vertically spaced horizontally extending rigid frame assemblies, vertical tension rods extending between the top, bottom and intermediate frame assemblies, vertical tubular spacer elements through which said rods pass, extending between adjacent frame assemblies with their ends in abutment therewith, and diagonal tension braces extending between adjacent frame assemblies and connected at their ends to said frame assemblies substantially at the corners thereof.

2. A rack as defined in claim 1 in which said braces are detachably connected to said frames to provide for on-site assembly of said racks.

3. A rack as defined in claim 1, in which said vertical tension rods are headed at one end to engage a frame assembly, and threaded at the other end to receive nuts, said nuts being effective to tension the rods and thus to apply compressive forces to the spacing tubes.

4. A rack as defined in claim 3, in which said rods fit snugly within said tubes so that said tubes and rods reinforce each other.

5. A rack as defined in claim 1, in which each of said frame assemblies comprise a plurality of crossing bars, said bars having interfitting notches at crossing points dimensioned to interfit to provide rigidity to said frame assemblies.

6. A rack as defined in claim 5, in which said crossing bars are additionally welded together at crossing points.

7. A rack as defined in claim 4, in which each of said frame assemblies comprise a plurality of crossing bars, said bars having interfitting notches at crossing points dimensioned to interfit to provide rigidity to said frame assemblies.

8. A rack as defined in claim 7, in which said crossing bars are additionally welded together at crossing points.

* * * * *